March 30, 1943.  C. E. FRASER  2,315,253

FILTER BED CLEANER WITH CONNECTED WASH WATER BOXES

Filed June 25, 1940

INVENTOR
CHARLES E. FRASER,
Ellis S. Middleton
ATTORNEY.

Patented Mar. 30, 1943

2,315,253

UNITED STATES PATENT OFFICE 2,315,253

FILTER BED CLEANER WITH CONNECTED WASH WATER BOXES

Charles E. Fraser, Kew Gardens, N. Y.

Application June 25, 1940, Serial No. 342,252

9 Claims. (Cl. 210—128)

The present invention relates to a method of and mechanism for cleaning filter beds.

It is common practice in the treatment of sewage, industrial wastes, etc. to pass liquids containing the same through relatively shallow beds of sand, aggregate or the like, which removes the solids therefrom. Such beds, in the course of time, become clogged with the retained material, even though the raw material undergoing treatment has been subjected to preliminary treatment such as sedimentation or the like. As a consequence, it becomes necessary to restore the bed to somewhere near its initial solid removal capacity and this may be done by cleaning it either intermittently or continuously.

A popular type of cleaning mechanism for the above purpose consists of a traveling cleaner operated above the bed, which includes a cleaner caisson. The caisson is intended to make a sealing contact with the portion of the bed immediately thereunder and this is accomplished usually by extending the side walls of the caisson into the bed material a sufficient distance and by providing sealing means, such as hollow, rotating drums at each end of the caisson and sliding contact along the sides. Consequently, the small portion of the bed which is being cleaned is temporarily completely cut off from a filtering action.

The cleaner caisson may be divided into two compartments, in the first of which the filter bed material is agitated and the retained solids loosened therefrom, the wash water resulting from such action passing over into the second or wash water compartment from which it is removed by a pump for disposal or further treatment.

The above mechanism is applicable both to upflow and downflow filters.

In downflow filters, it is customary to flow the unfiltered influent, with or without previous treatment, such as sedimentation, directly on top of the filter bed, the liquid passing through the bed, the solids being caught thereby and clean effluent resulting. This effluent then moves from beneath the bed and into a disposal channel, the level of which is maintained slightly below the level of influent so as to provide a sufficient hydraulic head to cause liquid movement through the bed. As the resistance of a filter bed changes from time to time due to the quantum of retained solids therein, means are provided for varying the hydraulic head between the influent and effluent levels. This usually consists in arranging the parts so that the influent will automatically build up to a higher level than that of the effluent. This may conveniently take the form of an adjustable weir on the effluent discharge. This weir may be automatically operated within a narrow range, by a float on the influent side of the filter.

A convenient method of agitating a portion of the filter bed to clean the same may take the form of an intermittently operated solenoid where the bed material is of the magnetite sand variety. This electromagnet, submerged in the liquid, being located relatively close to the bed, when energized for the space of about a second, lifts a section of the magnetite sand immediately thereunder and this movement and the subsequent dropping of the sand back into the bed, tends to separate the solids caught by the sand therefrom. Inasmuch as the lifting of this magnetite creates a zone of lessened resistance in the bed at that point, if, as in a downflow filter, the effluent level is higher than the wash water level in the solenoid compartment in the caisson, there will be a back rush of clean effluent up through the bed at the area of lessened resistance, which washes the loosened solids from the magnetite, over the partition between the agitation compartment and wash water box and into the latter from which it is removed by a pump. This cleaning procedure may take place continuously.

Other mechanism for creating the area of agitation in the bed other than an electromagnet may consist of pipes projecting a suitable distance into the bed material either to simply disturb the bed or this disturbance may be facilitated by injecting air or other liquid through the pipes. These methods of agitation are also suitable for a bed of sand or other aggregate not of the magnetite variety.

In upflow filters, much the same procedure takes place although in that case, the influent to be filtered flows from beneath the bed, up through the bed material, the clean effluent being on top thereof. As before, the influent level must be above that of the effluent in order to induce this hydraulic flow. Likewise, the cleaner mechanism creates an area of agitation in the bed, but in this case, the flood of water through the area of lessened resistance caused thereby is that of unfiltered influent from below the bed, thus carrying the loosened dirt over the wash water weir and into the wash water box where it is removed by a pump.

In both cases, it is to be noted that the cleaner caisson defines an area of resistance against the flow of liquid therethrough and is cut off from the liquid surrounding it by the seals which exist at the side and ends thereof and that consequently, no filtering action takes place in the area covered by the cleaning mechanism.

The main function of the seals is to assist the wash water pump to create a back head and prevent the wash water from contaminating the effluent. In the case of downflow filters, the seals also prevent the unfiltered influent from above the bed leaking into the cleaner caisson and from thence through the bed at its area of lessened resistance to thus contaminate the clean effluent below. In the case of upflow filters, the seal prevents the rush of unfiltered influent moving up through the area of lessened resistance in the bed from leaking outwardly through the cleaner caisson to contaminate the clean effluent above the bed.

During the cleaning operation where there is an upflow of liquid through the zone of agitation, the wash water carrying the dirt flows into a compartment from which it is removed. In order to reach the wash water compartment for removal, the dirty water usually flows over the top of an intermediate wall which may or may not be topped with an adjustable weir. In so doing, there is a tendency to carry with it some of the sand or bed aggregate which is subsequently lost. This is due to the fact that such intermediate wall is usually of restricted extent and consequently a large amount of liquid at high velocity must pass thereover during such operation.

It is the principal object of the present invention to prevent this loss of bed material by providing an extending wall and/or weir which as a consequence proportionately decreases the velocity of flow thereover. As a matter of fact, in such case the volume of liquid overflowing the wall into the wash water compartment may even be increased over that normally existing and still obtain the desirable results obtaining from a decreased velocity of flow.

The invention further contemplates the provision of a plurality of fluid-connected wash water boxes on two sides of the agitation producing means. As a consequence, the upflow of wash water has an outlet in two directions, all of which makes for more efficient washing and total operations.

The invention further consists in the novel arrangement, combination and construction of parts more fully hereinafter described and shown in the accompanying drawing, in which—

Figure 1:
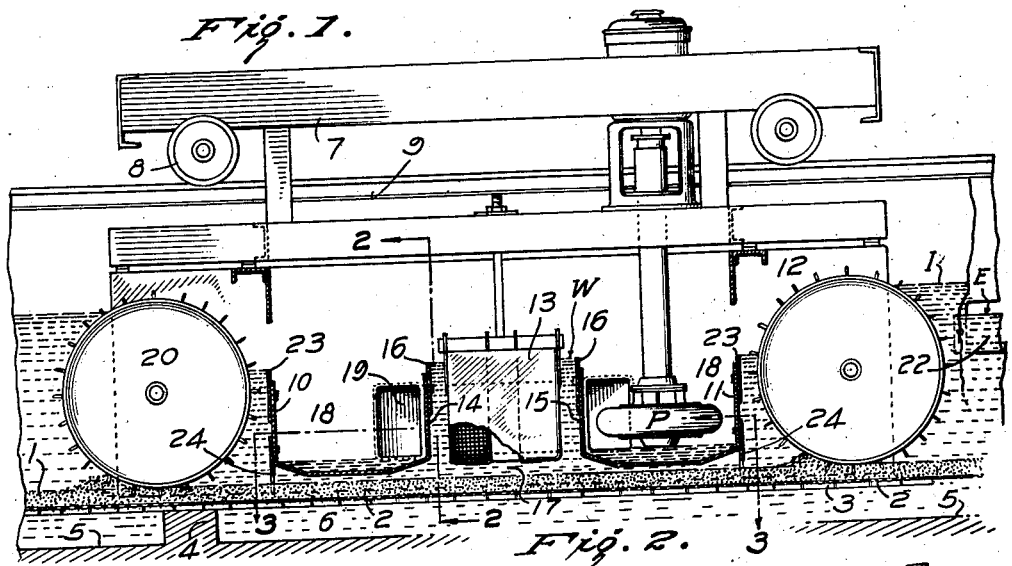
Fig. 1 is a side elevation partly in section of an apparatus embodying the present invention.
Figure 2:
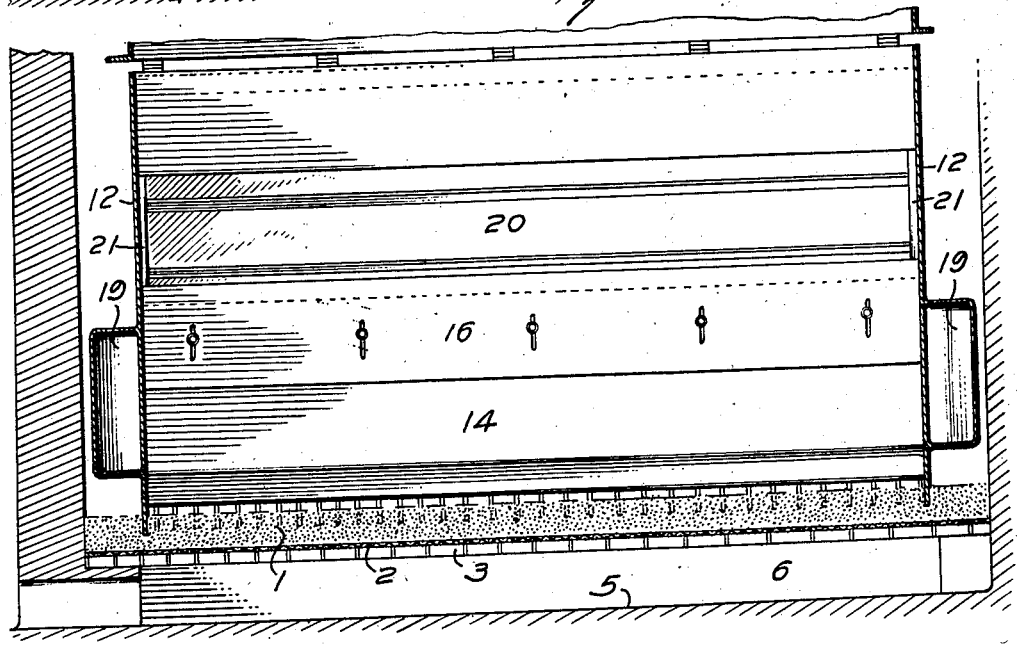
Fig. 2 is a sectional front view along the line 2—2 of Fig. 1.
Figure 3:
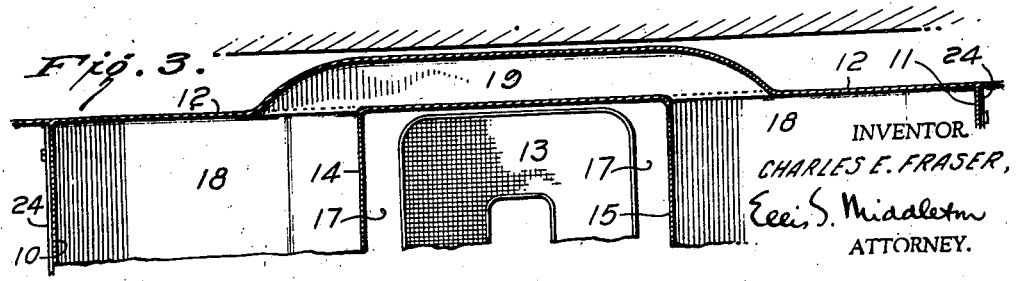
Fig. 3 is a sectional plan along the line 3—3 of Fig. 1.

Referring now to Fig. 1, the usual filter bed is shown at 1 of sand, such as that of the magnetite or silica variety or any other aggregate or filter media. A suitable thickness of bed material rests uopn a screen 2 supported by grid 3 resting upon the top of wall 4 so as to slightly space the grid from the bottom 5 of the filter tank leaving a space 6 therebetween.

A suitable cleaning mechanism may consist of a trolley 7 movable through wheels 8 driven by any suitable source of power, on trackway 9. Depending from the trolley is a caisson consisting of front wall 10, rear wall 11 and side walls 12. A solenoid or other agitation creating means is located between front and rear walls 10 and 11 and adjacent intermediate walls 14 and 15, each of which is topped by an adjustable weir 16.

As shown, the solenoid 13 is in what may be termed an agitation compartment 17, while on each side thereof are wash water compartments 18. A fluid-conducting passageway 19 connects the two wash water compartments 18 and extends out over the extreme lateral sides of the bed, not normally covered by the cleaner mechanism. A pump P in one of the wash water compartments is provided for removing the dirty water from both.

At the front and rear of the cleaner and mounted between side walls 12 thereof are rotatable sealing drums 20 having rubber wiper seals 21 at the ends thereof making a water tight connection with the side walls 12. The latter extend a sufficient distance into the bed material so that with the drums 20 an area is effectively sealed against a filtering operation during the bed cleaning period.

In a downflow filtering system, influent to a desired level I is flowed on top of the bed, the liquid passing through the bed, the clean effluent moving through the space 6, up a vertical channel and over an adjustable weir 22. This weir determines the effluent level E at an elevation sufficiently lower than the influent level I so as to create a hydraulic head tending to move liquid through the bed in a downward direction.

During the cleaning operation, the weirs 16 which separate the agitation compartment 17 from the wash water compartments 18 are adjusted so as to establish a wash water level W sufficiently lower than effluent level E so that when an area of agitation is created in the bed below the channel 17, with a consequent area of lessened resistance there, clean effluent will rise through the bed at that point, wash the retained solids therefrom, pass over the weirs 16 and into the wash water compartments, from which the dirty water is removed.

As shown in Fig. 1, the front and rear walls 10 and 11 of the cleaner caisson are provided with an opening over adjustable weirs 23 carried by that wall of each wash water compartment away from the agitation creating device. Those same walls carry depending rakes 24 adapted to penetrate approximately one-third into the bed.

As the cleaner passes over the bed, the rakes 24 break up the film of solids on and in the top portion of the bed 1 which have been slightly compressed by drum 20 so as to facilitate the washing of the retained solids, whether in flocced or unflocced form. There is some tendency for the uprush of water through the area of lessened resistance beneath the solenoid to move both forward and backwardly and beneath the wash water compartments. The mechanism thus described provides access for this dirty water into the wash water compartments over weirs 23. As a consequence, there is every provision for not only increasing the volume of wash water rising through the area of agitation beneath the solenoid but it may be received into the wash water compartments both at the front and rear thereof in a velocity materially decreased from that heretofore possible.

As shown, a solenoid may be used as the agitation creating means by suitable connection to an intermittent source of electrical energy so as to energize the same. Upon establishing this connection, where the sand of the filter bed is of the magnetite variety, the latter is magnetized and an area thereof bodily lifted up toward the solenoid which loosens the dirt adherent to and caught by the sand. During this time, clean effluent carries the loosened dirt into the wash water compartments. When the solenoid is deenergized, it releases the magnetite, which drops back into the bed substantially clean. This cleaning operation is then repeated intermittently until the entire area of the bed has been subjected to the purging action.

In cleaning devices of the present type heretofore used, there has been but a single wash water box and single weir over which wash water flows. In the present instance, it is to be noted that the lineal extent of weir has been doubled. As a consequence, the velocity of the same volume of water may be materially decreased. This has the decided advantage that the bed material has an opportunity to settle rather than to be carried over into the wash water compartments, removed and thereby lost.

On the other hand, where the bed material is composed of particles of sufficient size such that there is no great danger of them passing over the weir, the volume of water rising in the channel 17 to remove the dirt may be doubled. The fact that there are independently adjustable weirs makes it possible to flow the wash water preferentially either to one side or the other of the solenoid at will.

As a consequence of this combination, bed material of smaller particle size and therefore lighter weight may be used where the velocity is cut down, all of which makes for a cheaper first cost in bed installation as well as cheaper replacement costs.

On the other hand, where larger and heavier aggregates are used as the bed material, the upflow velocity of water for the removal of solids may be correspondingly increased.

While the invention has been shown and described with particular reference to specific embodiments, it is to be understood that it is not to be limited thereto but is to be constructed broadly and restricted solely by the scope of the appended claims.

I claim:

1. A filter bed cleaner including means for making a sealing contact with a filter bed to close off an area thereof from a filtering action, means to create a zone of agitation in the closed off area of the bed, a wash water box with a closed bottom on each of two sides of the agitation creating means and communicating with the agitating zone into which dirt released from the bed in the zone of agitation may pass, the two boxes being connected with a fluid passageway to conduct liquid from one wash water box to the other, and means to remove wash water from the boxes.

2. The cleaner of claim 1 in which the passageway extends laterally beyond the agitation creating means.

3. The cleaner of claim 1 in which the passageway is of less vertical extent than that of the wash water boxes.

4. The cleaner of claim 1 in which each wash water box is provided with a weir over which wash water passes to reach the wash water removal means.

5. The cleaner of claim 1 with a rake depending from each wash water box on its side away from the agitation creating means.

6. In combination, a filter bed, a travelling cleaner therefor including means making sealing contact with the bed to close off an area thereof from a filtering action, means having a length substantially less than the width of the bed to create a zone of agitation in the closed off area of the bed, said means extending in a lateral direction across the bed with at least one side of the bed extending beyond said means, a wash water box having a closed bottom ahead of and another behind the agitation creating means to receive wash water containing dirt removed from the bed in the agitated area, a fluid passageway connecting the two boxes, said passageway extending over the bed laterally beyond the agitation creating means, and means to remove dirty wash water from the boxes.

7. In combination, a filter bed, a travelling cleaner therefor including means making sealing contact with the bed to close off an area thereof from a filtering action, means to create a zone of agitation in the closed off area of the bed, a wash water box ahead of and a wash water box behind the agitation creating means communicating with each other and with the zone of agitation, said wash water boxes having a bottom and walls extending upwardly therefrom, an adjustable weir carried by the front and rear walls of each wash water box, each box having depending from its wall away from the agitation creating means a rake projecting below the normal upper surface of the bed material, and means to remove dirty water from the wash water boxes.

8. A filter bed cleaner, including means for making a sealing contact with a filter bed to close off an area thereof from a filtering action, means to create a zone of agitation in the closed off area of the bed, a wash water box on each of two sides of the agitation creating means and communicating with the zone of agitation, into which dirt released from the bed in the zone of agitation may pass, a rake depending from each wash water box on the side away from the agitation creating means, and means to remove wash water from the boxes.

9. In combination, a filter bed, a travelling cleaner therefor including means making sealing contact with the bed to close off an area thereof from a filtering action, means to create a zone of agitation in the closed off area of the bed, a wash water box ahead of and a wash water box behind the agitation creating means communicating with the zones of agitation, said wash water boxes having a bottom and walls extending upwardly therefrom, an adjustable weir carried by the walls of each wash water box, each box having depending from it a rake projecting below the normal upper surface of the bed material and means to remove dirty water from the wash water boxes.

CHARLES E. FRASER.